April 23, 1940.　　　T. BROWN　　　2,197,848
POWER LIFT ATTACHMENT FOR TRACTORS
Filed Oct. 7, 1936　　　5 Sheets-Sheet 2
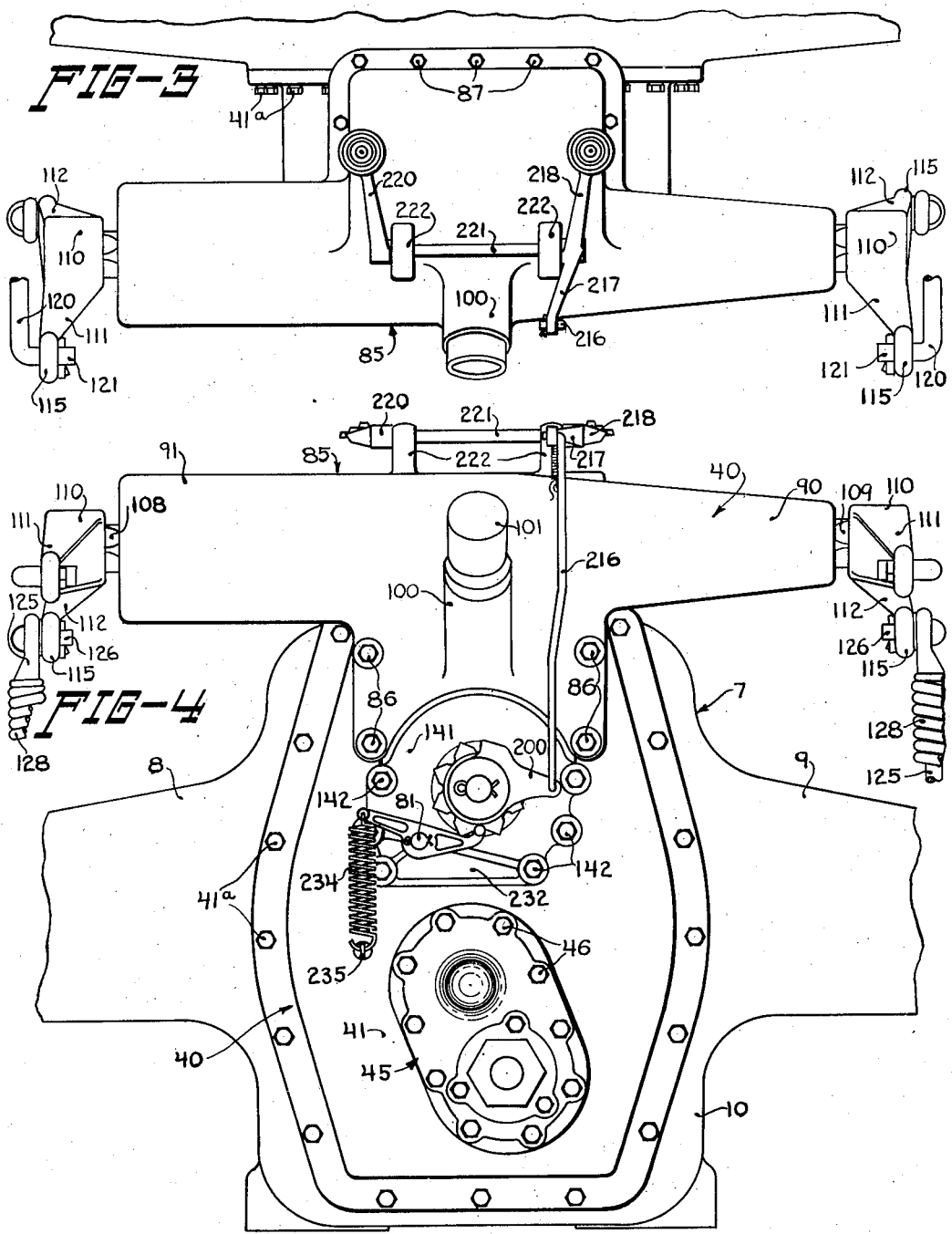
INVENTOR
Theophilus Brown
BY
Brown, Jackson, Boettcher & Dienner
ATTORNEYS April 23, 1940.  T. BROWN  2,197,848
POWER LIFT ATTACHMENT FOR TRACTORS
Filed Oct. 7, 1936  5 Sheets-Sheet 3
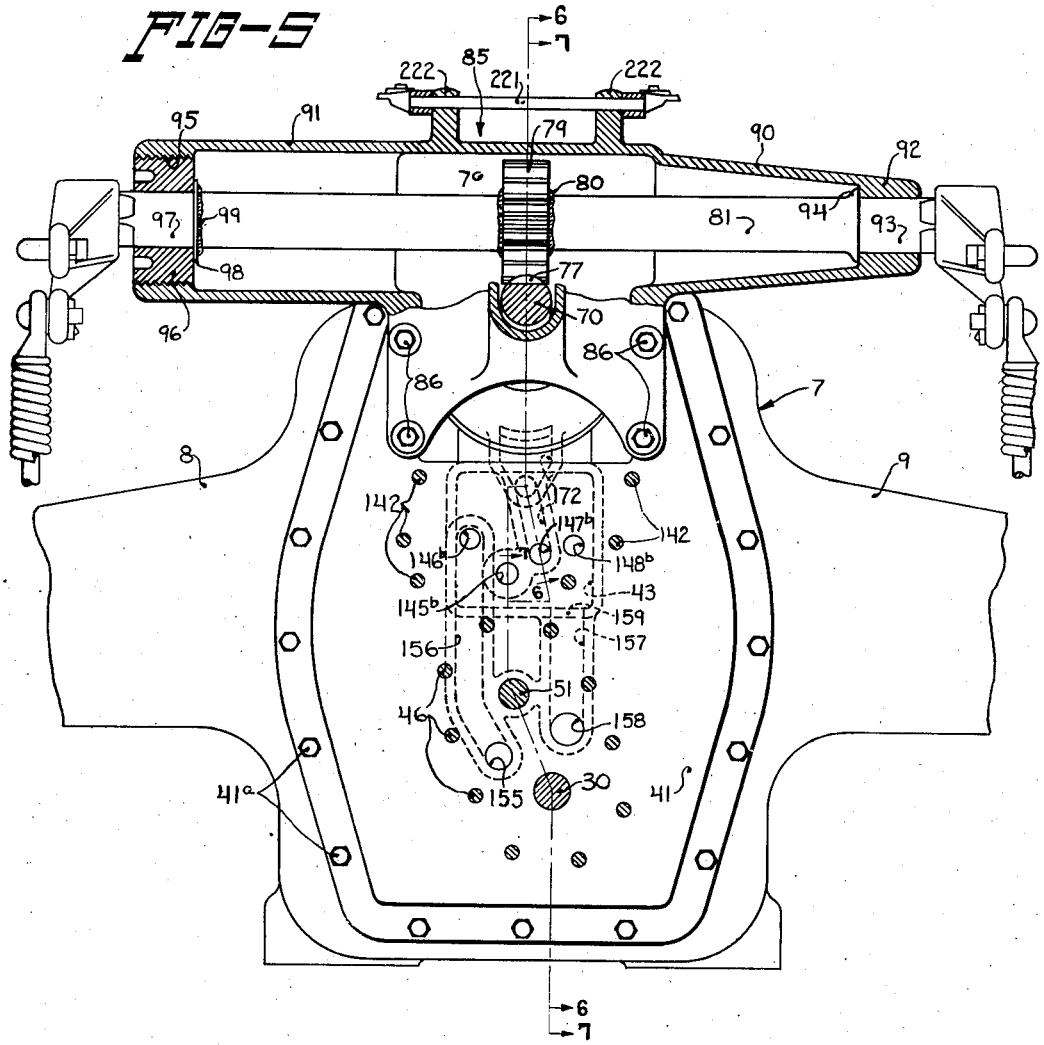
INVENTOR
BY Theophilus Brown
Brown, Jackson, Boettcher & Dienner
ATTORNEYS

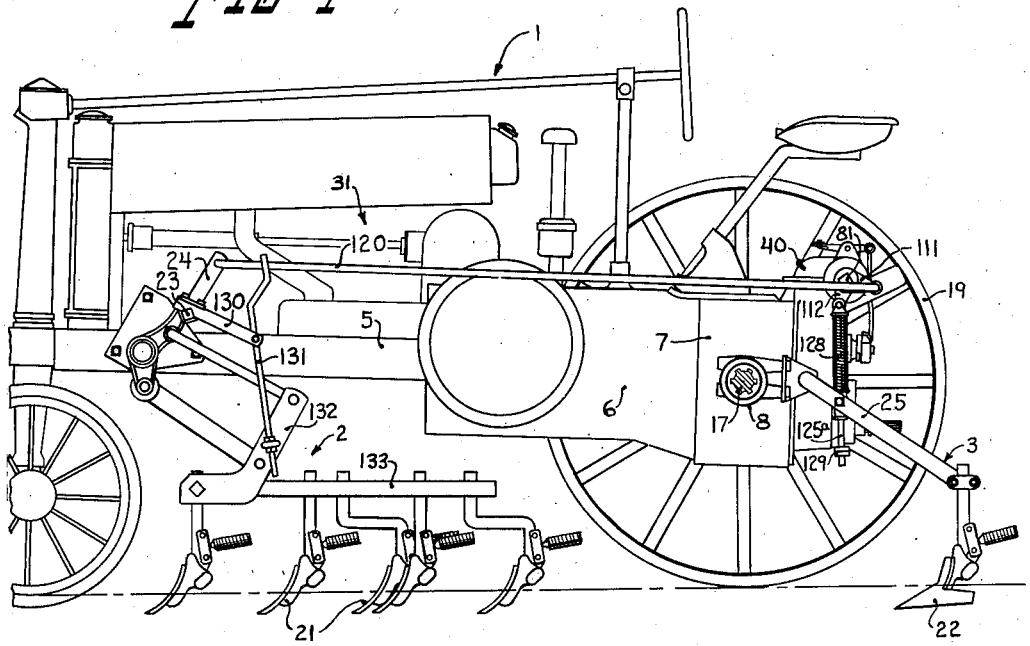
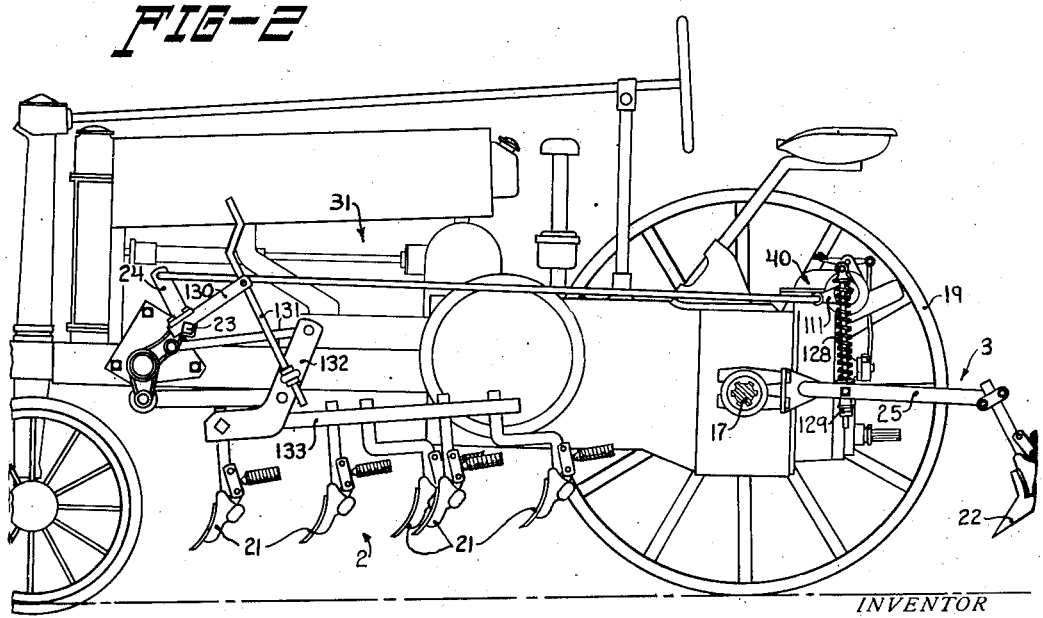

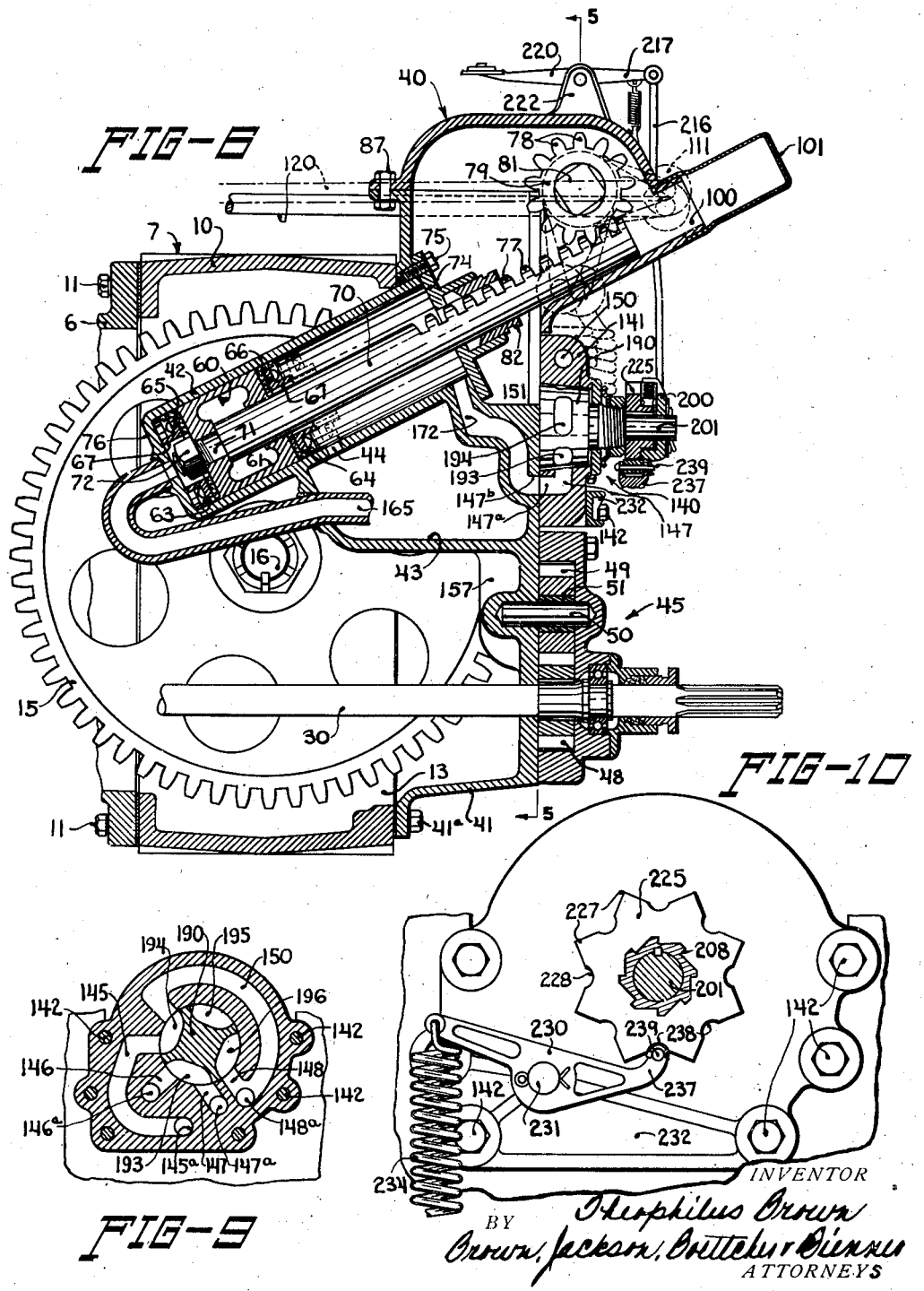

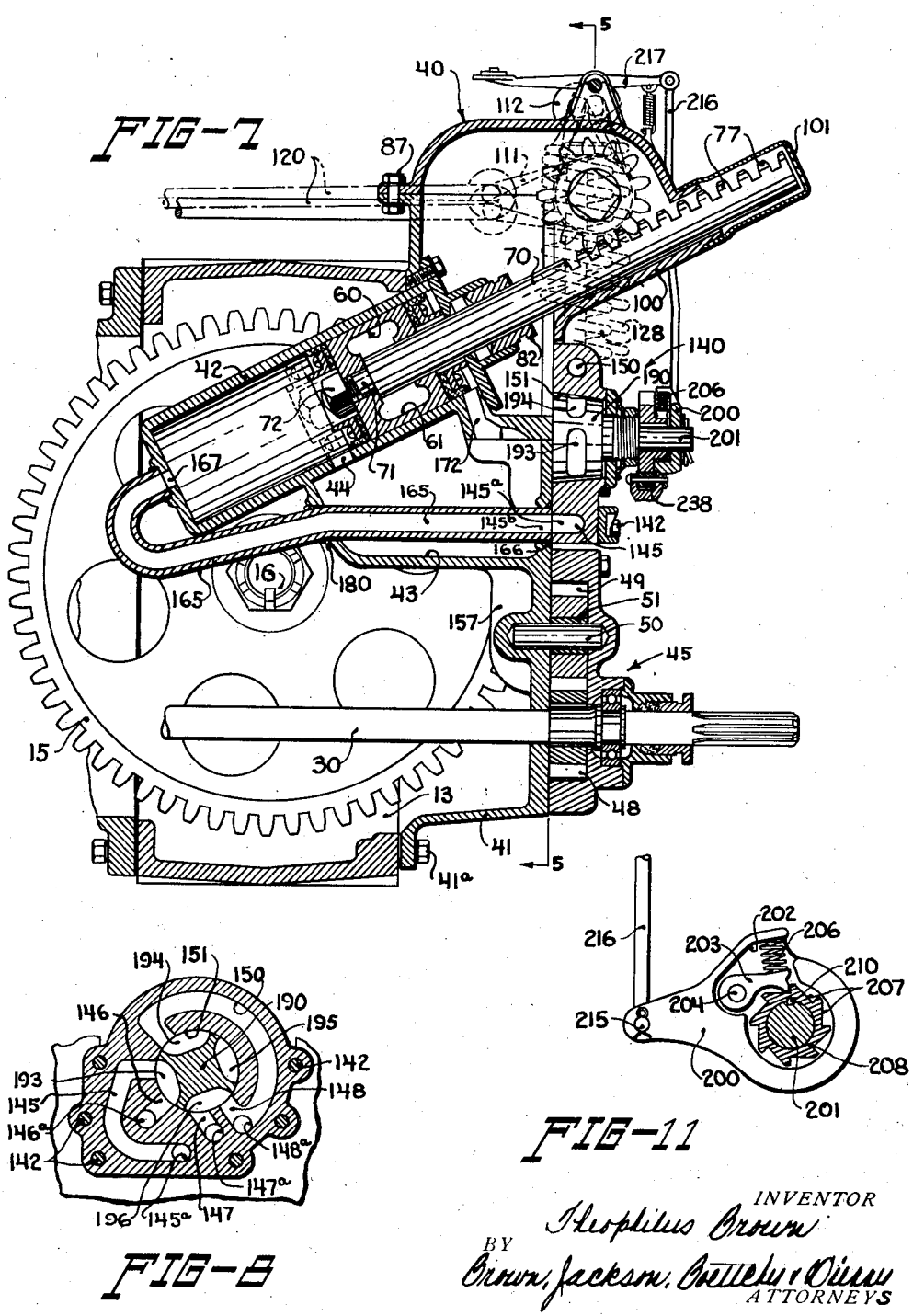

Patented Apr. 23, 1940

2,197,848

UNITED STATES PATENT OFFICE 2,197,848

POWER LIFT ATTACHMENT FOR TRACTORS

Theophilus Brown, Moline, Ill., assignor to Deere & Company, Moline, Ill., a corporation of Illinois Application October 7, 1936, Serial No. 104,413

17 Claims. (Cl. 97—50)

The present invention relates generally to agricultural machines, and more particularly to farm tractors adapted to carry implement means at the front and rear thereof which are raised and lowered by power derived from the tractor motor.

One of the principal objects of the present invention is the provision of a new and improved hydraulic power lift mechanism for raising and lowering implements associated with the tractor, and new and improved means facilitating the control of such power lift mechanism.

Specifically, a further object of the present invention is the provision of hydraulic power lift mechanism that includes a closed cylinder and a closed reservoir disposed in a position between the spaced drive gears of the tractor and connected to operate a transversely disposed power life rock shaft through rack and pinion means. A further object of the present invention in this connection is the provision of new and improved stop means, preferably associated with the piston, for limiting the rocking movement of the rock shaft to slightly greater than 180 degrees. A further object of the present invention in this connection is the provision of improved power lift mechanism in which the rock shaft can be actuated to bring the lifting connections associated therewith into an over-center position, both in raising and in lowering the associated implement means, whereby other locking means, either mechanical or hydraulic, is not necessary.

Another object of the present invention is the provision of new and improved valve means controlling the operation of the hydraulic mechanism, the valve means taking the form of a rotary valve which can be progressively moved into successive positions for alternately raising and lowering the implements. One of the advantages of this particular valve structure is that, through suitable ratchet means, a simple foot pedal can be connected to secure successive actuations of the hydraulic mechanism, thus leaving the operator's hands free to manipulate the tractor and the implements.

An additional object of the present invention is the provision of new and improved means for holding the rotary valve in any one of its successive positions.

Another object of the present invention is the provision of an agricultural machine embodying a tractor adapted to carry implement means at the front and rear thereof, in connection with power lift apparatus that is mounted on the tractor at a position permitting the connection of both implements thereto and in such manner that both implements may be held in either their raised position or their lowered position.

A further object of the present invention is the provision of a rock shaft that can be moved through 180 degrees and associated lifting connections to both implements whereby either or both implements may be held in either its raised or its lowered position.

These and other objects and advantages of the present invention will be apparent to those skilled in the art after a consideration of the following detailed description, taken in conjunction with the accompanying drawings illustrating the preferred construction.

In the drawings:

Figure 1 is a side view of an agricultural machine constructed according to the principles of the present invention and showing the implements as in their lowered or operating position;

Figure 2 is a view similar to Figure 1, but showing the implements in their raised or transport position;

Figure 3 is a fragmentary view, on an enlarged scale, looking downwardly at a power lift device at the rear of the tractor;

Figure 4 is a rear view of the power lift mechanism, looking forwardly toward the front of the tractor;

Figure 5 is a view similar to Figure 4 but corresponding generally to a section taken along the line 5—5 of Figures 6 and 7;

Figure 6 is a section taken along the line 6—6 of Figure 5 and showing the details of the power lift mechanism and associated parts in the positions they occupy when the implements are in their lowered or working position;

Figure 7 is a section taken along the line 7—7 of Figure 5;

Figures 8 and 9 show two successive positions of the rotary valve, Figure 8 showing the valve when it is positioned to force the piston outwardly to raise the implements and Figure 9 showing the position of the valve when the implements are to be lowered;

Figure 10 is an enlarged rear view showing the means for holding the rotary valve in any one of its successive positions; and Figure 11 is a view of the ratchet mechanism for progressively shifting the rotary valve.

Referring now to the drawings, more particularly Figures 1 and 2, the machine chosen to illustrate the principles of the present invention embodies a farm tractor 1 provided with forward implement means 2 and rear implement means 3. The tractor is of more or less conventional construction, having frame bars 5 connected to a transmission housing 6 at the rear of which a rear axle 7 is connected. The rear axle 7 includes laterally outwardly disposed sleeve housings 8 and 9, and the central banjo section 10 of the rear axle 7 is preferably bolted, as at 11 in Figure 6, to the rear portion of the transmission housing 6. The banjo section 10 of the rear axle 7 is formed with a rearwardly facing opening 13 (Figures 6 and 7) in which is a pair of laterally spaced drive gears 15 that are secured to the axle shafts 16 and 17, respectively, by which the rear wheels 19 of the tractor are driven. The implements 2 and 3 have tools 21 and 22, respectively, that are adapted to be raised and lowered. The tools 21 of the front implement are connected with a rock shaft 23 at each end of which is an arm 24, and the tools 22 of the rear implement are carried on arms 25. A longitudinally disposed power take-off shaft 30 (Figures 6 and 7) extends rearwardly through the rear axle housing opening 13 in between the gears 15, and is driven by the tractor motor 31 (Figures 1 and 2).

The hydraulic power lift unit is indicated in its entirety by the reference numeral 40 and includes a power lift casing 41 adapted to be bolted, as at 41a (Figure 4), over the opening 13 in the banjo section 10 of the rear housing 7. Preferably, but not necessarily, formed integrally with the power lift casing 41 is a cylinder 42 and a reservoir 43 communicating with the cylinder by means of an opening 44 substantially midway between the ends thereof. Both the cylinder 42 and the reservoir 43 are closed except for the necessary liquid connections. A pump unit 45 is fastened to the rear face of the power lift casing 41, as best shown in Figure 4, by bolts 46, and the pump unit 45 includes pump gears 48 and 49, the former being keyed to the rear portion of the power take-off shaft 30. The pump gear 49 is journaled for rotation on a stud 50 by any suitable means, such as a bushing 51. The pump 45 is driven by the rotation of the power take-off shaft 30, and the rotation of the pump gears 48 and 49 serves to deliver liquid under pressure to one end or the other of the cylinder 42 through suitable conduits and bores, and under the control of suitable valve mechanism which will be described later.

A piston 60 is mounted for reciprocation within the cylinder 42, and comprises a hollow apertured member 61 having leather washers 63 and 64 fastened to opposite ends by annular members 65 and 66, respectively, each of which has an extension 67 that projects axially outwardly of the piston a distance somewhat greater than the cupped portions of the leather washers 63 and 64. By engaging the ends of the cylinder, these extensions 67 serve as stops limiting the movement of the piston within the cylinder 42. A piston rod 70 has a reduced end 71 received in one of the apertures in the piston 60, and a nut 72 is threaded onto the end 71 of the piston rod for securely connecting the same to the piston 60. The other end of the piston rod 70 extends outwardly through a sealed opening in a closure member 74 which is fastened, as by bolts 75, over the upper end of the cylinder 42, the lower end of the latter also being closed, as indicated at 76. This outwardly extending end of the piston rod is provided with rack teeth 77 which mesh with the teeth 78 on a pinion 79 which is welded, as at 80 (Figure 5), to a power lift rock shaft 81.

Any suitable means, such as a packing gland 82, may be provided for sealing the upper end of the cylinder against leakage around the outer end of the piston rod 70.

The power lift rock shaft 81, referred to above, is supported for rocking movement in an upper transversely disposed housing 85 which is preferably, although not necessarily, formed separately from the power lift casing 41. Where the rock shaft housing 85 is a part separate from the power lift casing, it is preferably fastened thereto by bolts or cap screws 86 (Figure 5) and 87 (Figure 6). The rock shaft housing section 85 includes two laterally outwardly extending sleeves 90 and 91, the former being tapered and terminating in a bearing portion 92 receiving the end 93 of the rock shaft 81. A shoulder 94 is formed on this end of the rock shaft and cooperates with the bearing portion 92 in preventing axial movement of the rock shaft in one direction. The opposite housing sleeve 91 is substantially cylindrical and is threaded, as at 95, to receive a threaded bearing member 96 in which the end 97 of the power lift rock shaft 81 is journaled. A ring member 98 is welded, as at 99, to this end of the shaft, and acts against the bearing member 96 in preventing axial movement of the rock shaft 81 in an opposite direction. It will be noted that the threaded opening 95 is of a diameter sufficient to accommodate the pinion 79 so that the assembly of these parts is thereby facilitated. While preferably the bearing member 96 is threaded into position, it is to be understood that any other suitable way of fastening the bearing member in place in the rock shaft housing 85 may be employed if desired.

A tubular extension 100 is formed on the housing 85 to receive the outermost end of the piston rod 70 when the piston 60 is at the upper or outer end of the cylinder 42, and a pressed metal closure 101 is disposed over the opening in the tubular extension 100.

The outer ends of the power lift rock shaft 81 are squared, as at 108 and 109 (Figure 4), and a bell crank 110 is fixed to each end of the rock shaft 81. Each bell crank 110 includes two arms 111 and 112 arranged approximately at right angles to one another (see Figure 1), and each is provided with an apertured eye 115. Extending rearwardly from each of the arms 24 on the rock shaft 23 for the front implement 2 is a raising and lowering link 120, the rear end of which is turned inwardly, as at 121, and disposed in the apertured eye portion of the arm 111 associated therewith. Each of the other arms 112 is connected with the bars 25 of the rear implement 3 through a lifting link 125, the upper end of which is pivoted on a pin 126 carried in the apertured eye portion of the associated bell crank arm 112. A compression spring 128 surrounds each of the lifting links 125 and bears at its lower end against the associated tool bar 25. The lower end of the lifting link 125 is slidable in a bracket or other means carried by the associated tool bar 25, and serves thereby as a lost motion connection limited by any suitable form of stop means 129. When the tools 22 are in their operating position, the springs 128 are compressed and serve to yieldingly hold the tools 22 in ground engaging position, the extent of lost motion being indicated at 125a in Figure 1. When the tools are raised, the stops 129 at the lower ends of the links 125 come up against the bars 25 and elevate the rear implement tools. If desired, a similar arrangement might be arranged for the tools of the front implement 2. However, for convenience of illustration, I have shown the rock shaft 23 as provided with one or more arms 130, the outer ends of which are connected by adjustable rods 131 to the supports 132 for the tool beams 133 carrying the front tools 21.

The oscillation of the power lift rock shaft 81 through the rack and pinion connection 77, 79, with the hydraulic unit, is under the control of a simplified rotary valve mechanism which will now be described.

The controlling valve is indicated in its entirety by the reference numeral 140 and comprises a valve chamber 141 (Figures 4, 6 and 7) in the form of a casting that is bolted, as at 142, to the rear face of the hydraulic casing 41. The valve chamber 141 is provided with four cored passages, 145, 146, 147 and 148, and these passages have openings 145a, 146a, 147a and 148a, respectively, that lead to the face of the valve chamber casting 141 that is bolted against the casing 41. The casing 41 is provided with openings registering with the aforesaid openings, and in Figure 5, which is a view with the valve casing 141 removed, these registering openings in the hydraulic casing 41 are indicated at 145b, 146b, 147b and 148b, respectively. The cored passage 148, communicating with the opening 148a (Figures 8 and 9), includes an extension passage 150 which is arcuate and extends around to the other side of the valve receiving opening 151, which will be referred to later.

The pump 45 is arranged to discharge liquid under pressure through a high pressure opening 155 in the casing 41 (Figure 5), and this opening communicates with the registering openings 146a and 146b by means of a cored passage 156 formed in the wall of the casing 41. The low pressure side of the pump is in communication with a cored passage or duct 157 through a low pressure opening 158 formed in the casing 41 adjacent the high pressure opening 155, and the duct 157 opens into the reservoir 43 through an opening 159. A tube 165 is welded at one end, as at 166, over the opening 145b (Figure 5), and is thus in communication with the cored passage 145. The other end of the tube 165 extends between the drive gears 15 and is secured, as by welding or the like, to the forward or inner end of the cylinder 42, the latter having an opening 167 through which the tube 165 is in communication with the interior of the cylinder. The tube is also welded at 180 (Figure 7) where it passes out of the forward wall of the reservoir 43. The opposite end of the cylinder 42 communicates through a duct 172 (Figures 6 and 7) with the registering openings 147a and 147b (Figure 6).

The valve that is disposed in the valve receiving opening 151 and controls the flow of liquid to and from the various passages mentioned above is indicated in its entirety by the reference numeral 190, and as best shown in Figures 6 and 7, both the opening 151 and the valve 190 are frusto-conical in formation. The valve 190 is capable of rotation in the opening 151 and is provided with four spaced circumferentially extending ports or slots 193, 194, 195 and 196 which control the flow of liquid, usually oil, in accordance wth the position of the valve 190.

The operation of the control valve is substantially as follows: Turning now to Figures 6 and 9, when the valve 190 is in the position shown in these figures and the pump 45 is in operation, oil is delivered under pressure up through the opening 155 (Figure 5) and the passage 156 into the cored passage 146 through the registering openings 146a and 146b. In this position of the valve 190, the port or slot 193 directs the flow of oil through the passage 147 into the registering openings 147a and 147b (Figure 6), from whence the oil flows into the top or rear end of the cylinder 42, moving the piston into the position shown in Figure 6 and swinging the power lift arms 111 and 112 into the position shown in Figure 1. The liquid in the lower or forward end of the cylinder 42 is forced by the aforesaid movement of the piston 60 through the tube 165 back through the registering openings 145a and 145b (Figure 7), through the cored passage 145, the port or slot 194, and through the passage 150, the openings 148a and 148b (Figure 5), into the reservoir 43.

When the valve 190 is rotated in a counterclockwise direction through an angle of approximately 45 degrees, the valve takes the position shown in Figures 7 and 8. In this position, the oil under pressure coming from the conduit 156 through the opening 146a (Figure 8) passes through the valve port 193 and around the cored passage 145 through the openings 145a and 145b (Figure 5) into the tube 165 and through the opening 167 into the lower or forward end of the cylinder 42, thus forcing the piston 60 upwardly and outwardly into the position shown in Figure 7, swinging the power lift arms into the position shown in Figure 2. The oil on the upper side of the piston 60 is discharged through the passage 172, openings 147a and 147b, through the cored passage 147 (Figure 8), the valve port 196, and through the passage 148 and opening 148a, into the reservoir through the opening 148b registering with the opening 148a.

The function of the opening 44 in the intermediate portion of the cylinder 42 and communicating with the reservoir is to provide for the free discharge of the oil under pressure into the reservoir 43 when the piston reaches the end of its movement in either direction. This makes it unnecessary to provide any valve mechanism for cutting off the supply of oil under pressure, which would otherwise be necessary, and permits the use of a simple valve structure, as described above. The opening 44 is so disposed that, looking at Figure 6, as the piston 60 is forced toward the inner end of the cylinder, at about the point where the piston is in the position shown in dotted lines, the opening 44 is still covered by the piston but is just about to be uncovered. In this position of the piston (dotted lines), the arm 111 is in substantially dead center relation with respect to the link 120, the latter being shown in dotted lines in this dead center relation. The next increment of movement of the piston 60 will swing the arm 111 downwardly and, at the same time, will uncover the opening 44. The natural tendency of the tools of the implement at the front end of the tractor to run into the ground, together with the compressional force of the spring 128 associated with the rear implement 3, will cause the piston 60 to continue its movement to the inner end of the cylinder until the stop 67 bears against the lower or inner end of the cylinder 42. This will completely uncover the opening 44 so that the oil under pressure from the pump discharges idly into the reservoir 43. Also, the arm 111 will be swung downwardly into its lower dotted line position and will then cooperate with the link 120, full line position, and establish a toggle lock for holding the tools in their operating position (Figure 1), the same being true of the relationship between the arm 112 and the link 125 for the rear implement 3. When the piston is forced in the other direction, the action is substantially the same; that is, when the piston 60 reaches the dotted line position shown in Figure 7, the opening 44 is not quite uncovered and the arms 111 and 112 are in a dead center relationship with respect to the associated links. The next increment of movement of the piston 60 will begin to uncover the opening 44, and the weight of the implements at the front and rear of the tractor will then cause the rock shaft 81 and associated arms to continue their rotation until the piston 60 has been drawn against the upper end of the cylinder 42, thus completely uncovering the opening 44 and locking the tools in their raised position (Figure 2).

It is to be noted that a 45 degree movement of the valve 190 from the position shown in Figure 9 to the position shown in Figure 8 serves to cause the movement of the piston from one end of the cylinder to the other. The next succeeding 45 degree movement of the valve 190 will cause the piston to be moved back to its initial position. Thus, every 45 degree advance of the valve in one direction occasions the alternate movement of the piston from one end of the cylinder to the other and the consequent raising and lowering of the implements 2 and 3.

The valve 190 and associated ports can be arranged, as is obvious, to provide for alternately raising and lowering the implements for every successive advance of the valve either greater or less than 45 degrees. The form of the valve shown is preferred, however, because it permits convenient and ready manipulation of the valve into its successive positions in a progressive manner through a simple foot lever that can be positioned remotely from the valve itself and connected therewith through a simple ratchet mechanism which permits the instant return of the foot pedal to a position awaiting a subsequent actuation. In power farming machines and the like it is especially desirable to provide a foot actuated control for the power lift unit so as to leave the hands of the operator free to manipulate the tools, steer the tractor, and perform other operations that are frequently necessary when turning the machine around, as at the end of the row.

According to the present invention, the mechanism for progressively shifting the valve 190 into its successive positions comprises an arm 200 journaled on the rearwardly projecting shaft portion 201 of the valve 190. The arm 200 is provided with a recess 202 in which a pawl 203 is pivoted, as at 204. The pawl 203 is biased by a spring 206 for movement into engagement with one of the eight notches 207 formed on the ratchet hub 208 (Figure 11) that is keyed, as at 210, to the shaft 201 of the valve 190.

The outer end of the arm 200 is apertured to receive the inwardly bent end 215 of a link 216 that extends upwardly and is pivotally connected to a rearwardly extending arm 217 (Figure 3) that forms a part of a right hand foot pedal 218. A left hand foot pedal 220 is connected to the end of the shaft 221 opposite the right hand foot pedal 218, which is also attached to the shaft. The two foot pedals 218 and 220 are rockably supported by the shaft 221 on a pair of lugs 222 formed on the housing 85 (Figure 5).

The valve 190 is forced to come to its proper positions and is held in such positions by means best shown in Figure 10. A notched cam member 225 is formed on or connected with the ratchet hub 208 so as to rotate with the valve 190. The cam plate member 225 has triangularly shaped cam projections 227, between each of which is a generally circular depression 228. A cam follower lever 230 is pivoted on a stud 231 that projects rearwardly from a casting member 232 that is fastened in place by any suitable means, such as by being bolted in position by certain of the bolts 142 holding the valve casting 141 in position. The outer end of the follower cam lever 230 receives the upper end of spring 234, the lower end of which is fastened to a lug 235 (Figure 4) on the power lift casing 41. The other end of the lever 230 has an end 237 (Figures 6 and 10) that is bifurcated (Figure 6) and receives a roller 238 mounted on a pin 239 carried by the end 237 of the lever 230. The spring serves to yieldingly hold the roller 238 in one of the depressions 228 and thereby definitely positions the valve. To rotate the valve 190, it is necessary to apply a force to one of the foot pedals 218 and 220 which is sufficient to cam the roller 238 out of the associated circular notch 228 and over the adjacent triangular cam 227, but after the high point of the latter has been passed, the spring 234 will force th valve 190 around until the roller 238 comes to rest in the next depression 228, which will place the valve 190 in its next successive position.

While I have shown and described above the preferred structure embodying the principles of the present invention, it will be apparent that my invention is not to be limited to the specific details shown and described above, but that, in fact, widely different means may be employed in the practice of the broader aspects of my invention.

What I claim, therefore, and desire to secure by Letters Patent is:

1. Hydraulic power lift mechanism for tractors and the like, comprising a closed cylinder, a piston movable therein, a source of liquid under pressure including a liquid pump driven by the tractor, connections between said pump and said cylinder, and a rotary valve movable in one direction into successive positions for directing liquid under pressure alternately to opposite ends of said cylinder.

2. Hydraulic power lift mechanism for tractors and the like, comprising a cylinder, a piston movable therein, a liquid pump driven by the tractor, connections between said pump and said cylinder for directing liquid to opposite ends of the latter, and a rotary valve structure in said connections and adapted to be rotated in the same direction into a plurality of successive positions greater than two in number for directing liquid alternately to said opposite ends of the cylinder.

3. Hydraulic power lift mechanism for tractors and the like, comprising a cylinder, a piston movable therein, pump means driven by the tractor, connections between said pump means and said cylinder, a rotary valve incorporated in said connections and movable in one direction into successive positions progressively for directing liquid under pressure alternately to opposite ends of said cylinder, ratchet means for progressively shifting said rotary valve into its successive positions, and means on the tractor for operating said ratchet means.

4. Hydraulic power lift mechanism for tractors and the like, comprising a closed cylinder, a piston movable therein, a source of liquid under pressure, connections between said source and said cylinder, a rotary valve incorporated in said connections and movable in one direction into successive positions progressively for directing liquid under pressure alternately to opposite ends of said cylinder, a foot lever adapted to be pivoted on the tractor, and ratchet mechanism connecting said foot lever with said rotary valve and arranged to progressively shift the latter into its successive position by successive depressions of said foot lever, movement of the latter out of a depressed position being idle by virtue of said ratchet mechanism.

5. Hydraulic power lift mechanism for tractors and the like, comprising a closed cylinder, a piston movable therein, a source of liquid under pressure, connections between said source and said cylinder, a rotary valve incorporated in said connections and movable progressively in one direction into successive positions for directing liquid under pressure alternately to opposite ends of said cylinder, a ratchet arm rockable about the axis of rotation of said valve, a ratchet wheel carried by said valve, pawl mechanism carried on said ratchet arm and engageable with said ratchet wheel for rotating the shaft in said one direction only, a foot pedal movably mounted on the tractor and adapted to rock said ratchet arm in a direction to cause the rotary valve to be shifted into its next successive position, a notched member carried by said valve, and spring biased means cooperating therewith for releasably holding said rotary valve in its various successive positions into which it is moved by a pressure on said foot pedal.

6. Hydraulic power lift mechanism for tractors and the like, comprising a closed cylinder, a piston movable therein, a liquid pump actuated by the motor of the tractor, connections between said cylinder and said pump, means forming a rservoir for delivering liquid to said pump, a valve casing including a ported body having a frusto-conical valve receiving opening, the connections from said cylinder, pump and reservoir communicating with said valve receiving opening generally at one side of the same, a frusto-conical rotary valve mounted in said valve receiving opening and having a plurality of circumferentially spaced openings cooperating with said connections whereby successive movements of said rotary valve, less than 90 degrees, serve to direct liquid alternately to opposite ends of the cylinder, a ratchet arm mounted for rocking movement on said rotary valve about the axis of rotation of the latter, ratchet means connecting said arm with said valve, whereby rocking movement of the arm in one direction shifts said valve, movement of the arm in the other direction being independent of said valve, and a foot lever adapted to be pivoted on the tractor and connected to operate said arm.

7. Hydraulic power lift mechanism for tractors and the like, comprising a closed cylinder, a piston movable therein, a source of liquid under pressure, connections between said source and said cylinder, a rotary valve incorporated in said connections for controlling the movement of said piston, said valve being moved into a plurality of successive positions progressively for alternately directing liquid under pressure to opposite ends of said cylinder, a cam wheel carried by said rotary valve and having oppositely angled inclined sections with a generally circular notch between said sections, and a spring biased lever having a roller end adapted to seat in said circular notches for releasably holding said rotary valve in any one of its successive positions.

8. In a tractor having a rear axle housing provided with an opening and enclosing a pair of laterally spaced drive gears, hydraulic power lift mechanism comprising a generally vertically arranged housing adapted to be secured to said axle housing over said opening, a cylinder carried by said power lift housing and disposed in the space between said drive gears, a piston movably supported in said cylinder, a power lift shaft journaled in said power lift housing, and rack and pinion means connecting said shaft and piston.

9. In a tractor having a power take-off shaft and a rear axle housing receiving said shaft and provided with an opening and enclosing a pair of laterally spaced drive gears, hydraulic power lift mechanism comprising a hydraulic casing unit adapted to be secured to said axle housing over said opening and including a cylinder having closed ends and a closed reservoir, a housing extension secured to said casing unit and including laterally outwardly directed sections, a transversely disposed power lift shaft journaled in said sections, a pump driven from said power take-off shaft and adapted to serve as a source of liquid under pressure, connections between said pump, reservoir and opposite ends of said cylinder, a rotary valve controlling said connections, a piston movably mounted in said cylinder, and means connecting said piston and said power lift shaft for actuating the latter, said cylinder and reservoir being disposed between said drive gears.

10. Hydraulic power lift mechanism for tractors and the like comprising a power lift casing adapted to be secured to the tractor and including a cylinder having closed ends and a closed reservoir, a piston movable in said cylinder, a piston rod connected with and extending outwardly of one end of said cylinder in leak-tight relation, a power lift shaft journaled on said casing, and a rack and pinion connection between said piston rod and said power lift shaft.

11. Hydraulic power lift mechanism for tractors and the like comprising a power lift casing, a cylinder carried thereby, a piston movable in said cylinder, means for delivering liquid under pressure to opposite ends of said cylinder, means for controlling the flow of liquid to and from said cylinder including a rotary valve progressively movable into successive positions for alternately causing the piston to be moved in alternate directions, a notched wheel carried by said rotary valve, a member separately fastened to said casing and carrying a pivot, a lever mounted on said pivot and having one end formed to engage successive notches on said notched member, spring means for urging said lever into engagement with said notched member, one end of said spring being fastened to said lever and the other end to said casing, and ratchet mechanism for rotating said valve in one direction into successive positions.

12. In hydraulic power lift mechanism for tractors and the like, the combination of a cylinder having its ends closed, a piston movable in said cylinder, a piston rod fixed at one end to said piston and extending outwardly through one of the closed ends of said cylinder, said outwardly extending portion of the piston rod having transversely disposed rack teeth cut therein, and means for sealing said toothed portion of said piston rod against leakage.

13. In hydraulic power lift mechanism for tractors and the like, a cylinder, a piston movable therein, a packing cup at each end of the piston, and means for holding each packing cup in position on the piston, including a central portion disposed within the packing cup and extending axially outwardly from the piston a greater distance than said cup so as to cooperate with the ends of the cylinder to serve as a stop limiting the movement of the piston.

14. In a power lift mechanism for tractors and the like, the combination of a power lift casing including laterally outwardly directed axially aligned sleeve sections, the laterally outer end of one of said sections having journal means and the laterally outer end of the other section having a threaded portion with an internal diameter greater than the internal diameter of said journal means, a power lift shaft supported in said sleeve sections and including one end journaled for rocking movement on said journal means, and a bearing support for the other end of said shaft including a member threaded into the laterally outer end of the other sleeve section and having an internal bore of substantially the same diameter as said journal means.

15. In a power lift mechanism for tractors and the like, the combination of a power lift casing including laterally outwardly directed axially aligned sleeve sections, the laterally outer end of one of said sections having bearing means and the laterally outer end of the other section being threaded, a power lift shaft supported in said sleeve sections and including one end journaled for rocking movement on said bearing means, a pinion fixed to the intermediate portion of said shaft, said other sleeve section having an internal diameter sufficient to accommodate the insertion of the shaft including said pinion, and bearing means for the end of said shaft opposite said first bearing means and including a member threaded into the threaded end of said other sleeve section.

16. Hydraulic power lift mechanism for tractors and the like comprising a power lift casing, a cylinder carried thereby, a piston movable in said cylinder, means for delivering liquid under pressure to opposite ends of said cylinder, means for controlling the flow of liquid to and from said cylinder including a rotary valve progressively movable into successive positions for alternately causing the piston to be moved in alternate directions, a notched wheel carried by said rotary valve, a pivotally mounted lever carried by said casing and having one end formed to engage successive notches on said notched member, spring means for urging said lever into engagement with said notched member, and ratchet mechanism for rotating said valve in one direction into successive positions.

17. In a power lift mechanism for tractors and the like, the combination of a power lift casing including laterally outwardly directed axially aligned sleeve sections, the laterally outer end of one of said sections having journal means and the laterally outer end of the other section having a threaded portion with an internal diameter appreciably larger than the internal diameter of said journal means, a power lift shaft supported in said sleeve sections and having one end journaled for rocking movement on said journal means, said shaft being formed with a shoulder engaging one end of the journal means to limit axial displacement of the shaft in one direction, means serving as a second shoulder on the other end of said shaft, and a bearing support for said other end of the shaft, including a member threaded into the laterally outer end of the larger sleeve section and adapted to be disposed adjacent said second shoulder, whereby the axial displacement of the shaft in the other direction is limited.

THEOPHILUS BROWN.